US008546282B2

(12) United States Patent
Kinoshita et al.

(10) Patent No.: US 8,546,282 B2

(45) Date of Patent: Oct. 1, 2013

(54) GLASS FOR LIGHT GUIDE FIBER

(75) Inventors: Hiroaki Kinoshita, Akishima (JP); Anne Jans Faber, Veldhoven (NL); Mathi Rongen, Eindhoven (NL); Atsushi Goto, Tachikawa (JP); Makoto Tanabe, Hachioji (JP); Yuko Katahira, Kawaguchi (JP)

(73) Assignees: Olympus Medical Systems Corp., Tokyo (JP); Nederlandse Organisatie Voor Toegepast-Natuurwetenschappelijk Onderzoek Tno, VK Delft (NL)

( * ) Notice: Subject to any disclaimer, the term of this patent is extended or adjusted under 35 U.S.C. 154(b) by 0 days.

(21) Appl. No.: 13/458,267

(22) Filed: Apr. 27, 2012

(65) Prior Publication Data

US 2012/0302423 A1 Nov. 29, 2012

Related U.S. Application Data

(63) Continuation of application No. PCT/JP2011/073405, filed on Oct. 12, 2011.

(30) Foreign Application Priority Data

Oct. 12, 2010 (JP) ................................ 2010-229985

(51) Int. Cl.

| | |
|---|---|
| ***C03C 13/04*** | (2006.01) |
| ***C03C 3/076*** | (2006.01) |
| ***C03C 3/062*** | (2006.01) |
| ***C03C 3/068*** | (2006.01) |

(52) U.S. Cl.

USPC .................. 501/37; 501/55; 501/64; 501/67; 501/78; 501/79

(58) Field of Classification Search

USPC ................ 501/37, 55, 63, 64, 65, 67, 73, 77, 501/78, 79; 385/123, 141, 142, 144

See application file for complete search history.

(56) References Cited

U.S. PATENT DOCUMENTS

2012/0220442 A1* 8/2012 Ogino et al. .................... 501/37
2012/0289779 A1* 11/2012 Kinoshita et al. ............. 600/109

FOREIGN PATENT DOCUMENTS

| | | |
|---|---|---|
| EP | 0 098 648 | 1/1984 |
| JP | 54-087236 | 7/1979 |
| JP | 59-021539 | 2/1984 |
| JP | 2000-103625 | 4/2000 |
| JP | 2004-256389 | 9/2004 |
| JP | 2004-277281 | 10/2004 |
| JP | 2005-347171 | 12/2005 |
| JP | 2008-013421 | 1/2008 |
| JP | 2009-007194 | 1/2009 |
| JP | 2009-179535 | 8/2009 |
| JP | 2009-196878 | 9/2009 |
| JP | 2011-116621 | 6/2011 |
| WO | WO 2011052688 A1 * | 5/2011 |
| WO | WO 2012050116 A1 * | 4/2012 |

OTHER PUBLICATIONS

International Search Report, issued in corresponding International Patent Application No. PCT/JP2011/073405.

* cited by examiner

*Primary Examiner* — Karl Group
*Assistant Examiner* — Elizabeth A Bolden
(74) *Attorney, Agent, or Firm* — Kenyon & Kenyon LLP

(57) ABSTRACT

A glass for a light guide fiber GA1 is used in a core of a fiber 10 of a light guide, and has a refractive index nd between 1.56 and 1.74. The glass for a light guide fiber GA1 has the following composition: (A) $SiO_2$: 20 to 55 wt %, (B11) $B_2O_3$: 0 to 2.0 wt %, (B2) does not contain $P_2O_5$ and $GeO_2$, (C1) ($BaO+SrO+La_2O_3+Lu_2O_3+Ta_2O_5+Gd_2O_3+WO_3$): 39 to 46 wt %, (D1) ZnO: 4 to 16 wt %, (E) does not contain $Al_2O_3$, (F) does not contain $ZrO_2$, (G) does not contain PbO and $As_2O_3$, (H1) ($Na_2O+K_2O$): 4 to 10 wt %, (I) $Sb_2O_3$: 0 to 0.050 wt %, and (J1) ($Na_2SO_4+K_2SO_4$): 0.32 to 0.78 wt %.

5 Claims, 1 Drawing Sheet

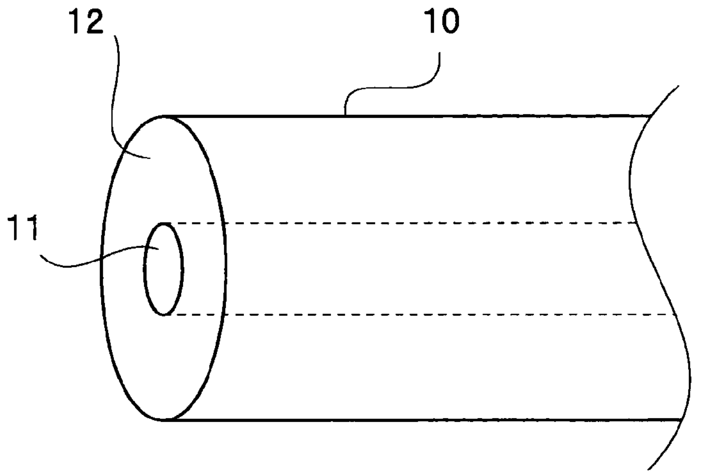
12
10
11

GLASS FOR LIGHT GUIDE FIBER

CROSS REFERENCE TO RELATED APPLICATION

This application is a continuation application of PCT/JP2011/073405 filed on Oct. 12, 2011 and claims benefit of Japanese Application No. 2010-229985 filed in Japan on Oct. 12, 2010, the entire contents of which are incorporated herein by this reference.

BACKGROUND OF THE INVENTION

1. Field of the Invention

An embodiment of the present invention relates to a glass for a light guide fiber, and more particularly relates to a glass for a light guide fiber that does not include lead.

2. Description of the Related Art

A light guide that transmits light has a configuration in which a large number of light guide fibers (hereunder, also referred to as "fibers") are bundled together. As shown in FIG. 1, an individual fiber 10 includes a core 11 that transmits light and a cladding 12 that is provided on an outer circumferential portion of the core 11 and reflects light so that the light does not leak to outside from a side surface of the core. Glass with a high refractive index is used for the core 11, and glass with a lower refractive index than the core 11 is used for the cladding 12.

Although lead glass is known as glass with a high refractive index, glass that does not use lead (hereunder, also referred to as "lead-free glass") has been developed for environmental reasons. For example, aluminosilicate glass that does not include lead is disclosed in Japanese Patent Application Laid-Open Publication No. 2004-256389 and Japanese Patent Application Laid-Open Publication No. 2004-277281. Further, lead-free glass that includes a rare-earth oxide and has a radiation shielding capacity is disclosed in Japanese Patent Application Laid-Open Publication No. 2009-7194. In addition, lead-free glass for a light guide is disclosed in Japanese Patent Application Laid-Open Publication No. 2009-196878, Japanese Patent Application Laid-Open Publication No. 2009-179535, and Japanese Patent Application Laid-Open Publication No. 2011-116621.

Medical endoscopes are used to perform not only normal-light imaging that uses white color light (for example, light of a wavelength between 380 and 750 nm), but also various kinds of special-light imaging that utilize wavelength characteristics of the irradiating light. For example, narrow band imaging (NBI) is a method that irradiates light of two wavelengths (390 to 445 nm and 530 to 550 nm) that have been converted to narrow-band light that is easily absorbed by hemoglobin in blood, and with which tumor tissue is easily distinguished by highlighting capillary vessels and fine mucosal patterns on the mucosal surface layers.

Further, in auto-fluorescence imaging (AFI), in order to image auto-fluorescence from a fluorescent substance present in living tissue such as collagen, narrow-band light (excitation light) of wavelengths of 390 to 445 nm and 530 to 550 nm is irradiated onto the tissue. Auto-fluorescence imaging utilizes a characteristic that, in comparison to normal tissue, tumor tissue attenuates auto-fluorescence generated by excitation light. Consequently, a high transmittance is required for glass for a light guide fiber, and in particular, a high transmittance with respect to blue color light (for example, light of a wavelength between 380 and 470 nm) is required for glass for endoscopes.

In addition, in some cases medical endoscopes are used while irradiating X-rays in order to check the position of a distal end portion or the like of the endoscope after inserting the endoscope into the body of a subject. When glass is exposed to X-rays, part of the chemical bonding thereof is broken or strained and as a result the glass is colored. Breakage and strain of chemical bonding of glass caused by radiation exposure is gradually eliminated over time by impartation of thermal energy or by energy of light that passes through the inside of the glass, and the glass also recovers from such coloring.

X-ray resistance, that is, the degree to which it is difficult for glass to be colored by X-ray exposure and the ease with which glass recovers from such coloring, changes depending on the glass composition. High X-ray resistance is required for glass for light guide fibers of a medical endoscope.

SUMMARY OF THE INVENTION

A glass for a light guide fiber according to one aspect of the present invention has a refractive index nd between 1.56 and 1.74, and has the following composition: (A) $SiO_2$: 20 to 55 wt %, (B11) $B_2O_3$: 0 to 2.0 wt %, (B2) does not contain $P_2O_5$ and $GeO_2$, (C1) ($BaO+SrO+La_2O_3+Lu_2O_3+Ta_2O_5+Gd_2O_3+WO_3$): 39 to 46 wt %, (D1) ZnO: 4 to 16 wt %, (E) does not contain $Al_2O_3$, (F) does not contain $ZrO_2$, (G) does not contain PbO and $As_2O_3$, (H1) ($Na_2O$ and $+K_2O$): 4 to 10 wt %, (I) $Sb_2O_3$: 0 to 0.050 wt %, and (J1) ($Na_2SO_4+K_2SO_4$): 0.32 to 0.78 wt %.

BRIEF DESCRIPTION OF THE DRAWING

FIG. 1 is a schematic diagram for describing the structure of a light guide fiber.

DETAILED DESCRIPTION OF THE PREFERRED EMBODIMENT

<Light Guide Fiber Production Method>

First, a method of producing a light guide fiber will be briefly described. As described above, the light guide fiber 10 has the cladding 12 that is provided on the outer circumferential portion of the core 11 that includes glass with a high refractive index that transmits light. The cladding 12 includes glass with a low refractive index and reflects light so that light does not leak to outside from the side surface of the core.

For example, a preform process is available as a method of producing the light guide fiber 10. In the preform process, first, a preform with a large cladding diameter and a large core diameter is prepared by a rod-in-tube method or a double crucible method. In the rod-in-tube method, a rod that includes core glass is inserted into a hollow portion of a tube that includes cladding glass, flexibility is imparted thereto by heating from an outer circumferential portion of the glass by means of an electric furnace or the like, and the fiber 10 of a desired diameter is obtained by fibering, that is, by heating and stretching the glass. In the double crucible method, two crucibles are provided, namely, a crucible used to melt core glass and a crucible used to melt cladding glass that is arranged around the crucible used to melt core glass. A nozzle that pushes out molten cladding glass is disposed around a nozzle that pushes out molten core glass. By drawing out the molten core glass and cladding glass simultaneously from the respective nozzles and fibering, the fiber 10 of a desired diameter is obtained.

In this connection, conditions required with respect to the cladding glass include the following: (1) a refractive index nd of the cladding glass is less than that of the core glass; (2) the cladding glass has good chemical durability; (3) a thermal expansion coefficient (α) thereof is a value close to that of the core glass; (4) crystal does not occur in the glass when drawing fiber; and (5) adhesiveness with respect to the core glass is favorable.

Therefore, as the cladding glass material, material may be selected from among known kinds of lead-free glass after taking into consideration the compatibility with the core glass of the embodiment that is described later. For example, glass having a composition that includes $SiO_2$: 41 to 46 wt %, $B_2O_3$<14 wt %, $Al_2O_3$<10 wt %, $Na_2O$<11 wt %, $K_2O$<14 wt %, $Li_2O$<1.5 wt %, F<0.2 wt %, and a clarifying agent of a customary amount can be used as the cladding glass material.

It is necessary for a medical endoscope to illuminate an object in order to carry out observation inside a dark body cavity. Therefore, a light guide is used to guide light generated by a light source apparatus to an illumination section arranged at a distal end portion of an insertion portion of the endoscope. In the case of a light guide used in a medical endoscope, an NA of approximately 0.55 to 0.90 that is large in comparison to the NA of a communication fiber or the like is required since it is necessary to illuminate the inside of the body over a wide area. For example, a refractive index nd between 1.56 and 1.74 is required for the core glass, and material with a smaller refractive index than the aforementioned refractive index is selected as the cladding glass material, such as, for example, glass with a refractive index nd between 1.47 and 1.52.

<Measurement Method>

Next, methods of measuring the transmittance and X-ray resistance of a glass for a light guide fiber and the like are described.

Generally, the degree of coloring of glass is measured based on Japanese Optical Glass Industrial Standard JOGIS J02. According to this standard, to measure the degree of coloring, a spectral transmittance curve (including surface reflection) of opposing-surfaces-polished samples with a thickness of 10 mm is measured, and wavelengths at which the transmittance is 80% and 5% of the total transmittance are shown in 10 nm units.

The transmittance is measured based on Japanese Optical Glass Industrial Standard JPGIS 17-1982. According to this standard, the transmittances of two glass samples of different thicknesses (thicknesses of 3 mm and 10 mm) are measured, a calculation is performed excluding loss due to surface reflection, and the transmittance is shown as the transmittance at 10 mm.

However, with respect to evaluation of a glass for a light guide used in a medical endoscope according to the embodiment, because the measurement accuracy according to these common methods that use a sample with a thickness of 10 mm is insufficient, it is not possible to determine whether the quality of the glass for a light guide is acceptable or not. This is because the length of a light guide of a medical endoscope that is used under X-ray irradiation is, for example, 3.6 m, and thus the optical path length is extremely long. The transmittance for a measurement length of 10 mm of a glass for which the transmittance of a light guide of a length of 3.6 m becomes, for example, 78% (78%/3.6 m) or more is 99.93% or more.

However, even in the case of a commercially available spectrophotometer that has a relatively high accuracy (for example, LAMBDA 750 manufactured by Perkin Elmer), the measurement accuracy with respect to transmittance is only around ±0.1%. That is, there is a possibility that the actual transmittance of glass for which a measurement value is a transmittance of 99.93%/10 mm is within a range of 99.83%/10 mm to 100.03%/10 mm. To convert this transmittance range for a measurement length of 10 mm to a transmittance range for a measurement length of 3.6 m, it is necessary to multiply the transmittance for 10 mm by 360. Since this conversion results in a transmittance range of 54.2%/3.6 m to 111.4%/3.6 m, it is not possible to determine whether the quality of the glass is acceptable or not. Consequently, a measurement method with better accuracy was required in order to determine the suitability of the glass.

To solve this problem, the present inventor prepared a glass sample with a thickness of approximately 30 cm and a glass sample with a thickness of 1 cm, and used a method that excluded surface reflection by calculation. In addition, there was the problem that in the case of a condensed beam of a conventional, commercially available measuring instrument, an optical path thereof changes according to the refractive index and thickness, and hence the size of an image on a photoelectric surface in a detection instrument changes and consequently a measurement value also changes. Therefore, a parallel light flux that was precisely controlled by a self-made jig was used for measurement. In this connection, a glass bar with a length of approximately 30 cm, that is, a thickness of 30 cm that was used for measurement was a semi-manufactured product to be processed after measurement to form the fiber 10 by, for example, a rod-in-tube method. More specifically, according to the present measurement method it is possible to determine whether the quality of a glass that is in the process of being manufactured is acceptable or not.

The transmittance for a measurement length of 30 cm of a glass for which a transmittance with respect to light of a wavelength of 400 nm in the aforementioned light guide with a length of 3.6 m becomes, for example, 78% (78%/3.6 m), is 97.95%. Even if the measurement accuracy is ±0.1%, it is only necessary to multiply by 12 to convert the transmittance for the measurement length of 30 cm to a transmittance for the measurement length of 3.6 m. Since the transmittance range obtained as the result of such conversion is 77.04%/3.6 m to 78.95%/3.6 m, it is possible to substantially determine whether the quality of the glass is acceptable or not.

In the following measurements, a transmittance (T380-750) of light of a wavelength between 380 and 750 nm over a length of 30 cm and a transmittance (T400) of light of a wavelength of 400 nm over a length of 30 cm were measured. In this connection, a mean value of the transmittance of light in the range of wavelengths between 380 and 750 nm was taken as the transmittance (T380-750).

The refractive index nd was measured by a known method.

On the other hand, as X-ray resistance measurement samples, together with glass prepared from the same melt as the transmittance measurement samples, a quartz rod was dipped into the glass melt and fibers were drawn by hand to prepare mono-index fibers with a diameter (ϕ) of 1 mm and a length of 1 m.

Subsequently, using an X-ray apparatus (tube voltage=100 kV, tube current=2.0 mA, wavelength=0.05 nm to 0.3 nm), and with a space of 30 cm between the fiber and the X-ray source, X-rays were irradiated from the side surface of the fiber until the exposure amount reached 2.5 Gy (Gray). Thereafter, the fiber that was subjected to X-ray exposure was connected to a xenon lamp light source apparatus and a recovery process was implemented by guiding an illuminating light of 64 lumen/$mm^2$ for 600 minutes. This recovery process is performed to evaluate X-ray resistance in a manner that is closer to the actual usage environment of an endoscope.

More specifically, the present method takes into account a fact that recovery caused by white color light supplied from a light source also occurs in a fiber at the same time as coloring caused by X-ray irradiation when using an endoscope under X-ray irradiation. The present evaluation method is an accelerated test that, when an X-ray exposure amount is taken as 2.5 Gy, irradiates at one time X-rays of an amount corresponding to several hundred times an amount of irradiation that is normally irradiated at one time in a surgical operation or the like. Consequently, the glass is subjected to a high degree of coloring, and differences also appear in the effect of the recovery process depending on the glass composition. However, it has been confirmed separately that the method is valid as an X-ray resistance accelerated test method.

A xenon lamp light source (wavelength between 380 and 750 nm) and an actinometer including an integrating sphere having the same sensitivity as the xenon lamp light source and the spectral luminous efficiency were used for measuring the amount of light guided by the fiber. One end face of the fiber was connected to the xenon lamp light source, the other end face of the fiber was connected to the integrating sphere, and the amount of light transmitted through the fiber was measured. Measurement was performed with respect to the fiber before X-ray exposure, the fiber after being subjected to exposure, and the fiber after the recovery process, respectively, and light amounts were calculated as integrated values (counts).

A scale of X-ray resistance was obtained by taking a value in which a light amount after the recovery process was expressed as a percentage relative to the light amount before the X-ray exposure as an "X-ray resistance value: XR". In other words, the X-ray resistance value XR is an index that shows the amount of a decrease in the amount of light of a wavelength between 380 and 750 nm caused by radiation exposure. An X-ray resistance value XR of 100% indicates that the glass recovered completely to the state before radiation exposure from the coloring caused by X-ray irradiation, and an X-ray resistance value XR of 70% indicates that the amount of light decreased by 30% and became darker.

More specifically, the composition of a glass can be analyzed using fluorescent X-ray analysis, EPMA, SEM-EDX, ICP, or a titration method or the like that are known analytical methods. On the other hand, although it is difficult to perform an impurity analysis by the aforementioned methods because a value to be analyzed is extremely small, impurities can be measured using a method such as ICP, ICP-MS, TOF-SIMS or LA-ICP (laser ablation ICP), or GDMS. Further, it is possible to estimate the impurity amount by comparing a spectrum produced by a spectrophotometer and an absorption coefficient with respect to impurity ions.

According to the current embodiment, the composition (main components) of the glass was measured by EPMA, the trace impurity content in the glass was measured by ICP-MS and GDMS (Glow Discharge Mass Spectrometry).

In this connection, when showing a composition or the like, if the range of a content of a material includes "0%", it means the relevant material is an optional component and not an essential component. Further, when showing an impurity content, the term "below" means that the content is less than or equal to a measurement limit.

Composition of Embodiment and Comparative Examples

Hereunder, glasses for light guide fiber GA1 to GA5 (hereunder, referred to as "glass GA1 et cetera") according to an embodiment of the present invention and glasses GAR1 to GAR3 (hereunder, referred to as "glass GAR1 et cetera") according to comparative examples are described. In this connection, a raw material with few impurities that was selected from among oxides that are commonly used for glass was used as the material of the glass GA1 et cetera that are described below. Further, a metal compounds such as a metallic carbonate, nitrate, or chloride, or an oxide that is commonly used for glass production may also be used as the raw material of the glass GA1 et cetera.

Table 1 shows the compositions of the glasses for light guide fiber GA1 et cetera according to the embodiment and the compositions of the glass GAR1 et cetera according to the comparative examples.

TABLE 1

| | (wt %) | GA1 | GA2 | GA3 | GA4 | GA5 | GAR1 | GAR2 | GAR3 |
|---|---|---|---|---|---|---|---|---|---|
| (A) | $SiO_2$ | 40.03 | 36.40 | 36.40 | 51.96 | 23.12 | 34.00 | 41.57 | 40.00 |
| (H) | $(Na_2O + K_2O)$ | 8.42 | 9.60 | 9.50 | 5.82 | 0.96 | 5.99 | 6.53 | 2.28 |
| | $Na_2O$ | 6.24 | 7.42 | 7.32 | 5.82 | 0.96 | 3.99 | 4.35 | 0.10 |
| | $K_2O$ | 2.18 | 2.18 | 2.18 | 0.00 | 0.00 | 2.00 | 2.18 | 2.18 |
| (E) | $Al_2O_3$ | 0.00 | 0.00 | 0.00 | 0.00 | 0.00 | 2.00 | 1.98 | 0.00 |
| (B1) | $B_2O_3$ | 0.00 | 1.90 | 1.90 | 0.00 | 1.90 | 7.00 | 0.00 | 3.20 |
| (D) | ZnO | 12.08 | 6.03 | 6.03 | 14.52 | 0.00 | 9.00 | 9.08 | 4.00 |
| (F) | $ZrO_2$ | 0.00 | 0.00 | 0.00 | 0.00 | 0.00 | 3.50 | 5.32 | 2.61 |
| | $La_2O_3$ | 9.27 | 8.70 | 5.70 | 0.00 | 24.98 | 11.50 | 13.77 | 6.20 |
| | BaO | 26.87 | 26.87 | 27.87 | 26.87 | 16.70 | 27.00 | 21.55 | 33.12 |
| | SrO | | | | | 15.01 | | | |
| | $Nb_2O_5$ | | | | | 0.62 | | | |
| | $Ta_2O_5$ | 3.00 | 10.00 | 4.99 | | 15.03 | | | 2.73 |
| | $Lu_2O_3$ | | | 2.00 | | | | | |
| | $Gd_2O_3$ | | | 3.00 | | | | | |
| | $WO_3$ | | | 2.00 | | | | | |
| | $Li_2O$ | | | | | | | | 1.00 |
| | CaO | | | | | | | | 2.85 |
| (I) | $Sb_2O_3$ | 0.005 | 0.001 | 0.010 | 0.050 | 0.050 | 0.010 | 0.200 | 0.010 |
| (J) | $(Na_2SO_4 + K_2SO_4)$ | 0.32 | 0.50 | 0.60 | 0.78 | 1.63 | 0.00 | 0.00 | 2.00 |
| (B2) | $P_2O_5$ | 0.00 | 0.00 | 0.00 | 0.00 | 0.00 | | | |
| (B2) | $GeO_2$ | 0.00 | 0.00 | 0.00 | 0.00 | 0.00 | | | |
| (G) | PbO | 0.00 | 0.00 | 0.00 | 0.00 | 0.00 | | | |
| (G) | $As_2O_3$ | 0.00 | 0.00 | 0.00 | 0.00 | 0.00 | | | |
| (C) | *X | 39.14 | 45.57 | 45.56 | 26.87 | 71.72 | 38.50 | 35.32 | 42.05 |
| | Total (wt %) | 100.00 | 100.00 | 100.00 | 100.00 | 100.00 | 100.00 | 100.00 | 100.00 |
| Impurities | Fe (ppm) | 0.40 | 0.40 | 0.40 | 0.46 | 0.70 | 3.14 | 3.40 | 3.30 |
| | Cr (ppm) | 0.01 | 0.01 | 0.02 | 0.03 | 0.03 | 0.82 | 1.18 | 0.64 |
| | Co (ppm) | 0.01 | 0.01 | 0.01 | 0.01 | 0.01 | 0.12 | 1.16 | 0.12 |

TABLE 1-continued

| (wt %) | GA1 | GA2 | GA3 | GA4 | GA5 | GAR1 | GAR2 | GAR3 |
|---|---|---|---|---|---|---|---|---|
| Ni (ppm) | 0.01 | 0.01 | 0.01 | 0.02 | 0.02 | 0.41 | 1.13 | 0.42 |
| Pt (ppm) | 0.20 | 0.00 | 0.00 | 0.20 | 0.00 | 0.20 | 1.31 | 0.40 |
| nd (−) | 1.64 | 1.65 | 1.63 | 1.56 | 1.74 | 1.63 | 1.65 | 1.63 |
| T(380-750) (%/m) | 98.2 | 99.4 | 99.3 | 98.4 | 97.0 | 76.4 | 79.0 | 82.7 |
| T(400) (%/m) | 98.7 | 99.1 | 99.1 | 98.8 | 93.6 | 76.8 | 53.0 | 80.9 |
| XRD (%) | 95.1 | 100.0 | 90.4 | 94.3 | 90.0 | 48.7 | 72.5 | 63.5 |

*X = ($BaO + SrO + La_2O_3 + Lu_2O_3 + Ta_2O_5 + Gd_2O_3 + WO_3$)

As shown in Table 1, the compositions of the glass GA1 et cetera according to the embodiment satisfy all of the following conditions:

Refractive index nd: 1.56 to 1.74,
(A) $SiO_2$: 20 to 55 wt %,
(B1) $B_2O_3$: 0 to 4.0 wt %,
(B2) does not contain $P_2O_5$ and $GeO_2$,
(C) ($BaO+SrO+La_2O_3+Lu_2O_3+Ta_2O_5+Gd_2O_3+WO_3$): 25 to 72 wt %,
(D) ZnO: 0 to 30 wt %,
(E) does not contain $Al_2O_3$,
(F) does not contain $ZrO_2$,
(G) does not contain PbO and $As_2O_3$,
(H) ($Na_2O+K_2O$): 0 to 15 wt %,
(I) $Sb_2O_3$: 0 to 0.050 wt %,
(J) ($Na_2SO_4+K_2SO_4$): 0.26 to 1.63 wt %

The above conditions are described below.

<Condition (A) $SiO_2$: 20 to 55 wt %; Condition (B1) $B_2O_3$: 0 to 4.0 wt %; and Condition (B2): does not contain $P_2O_5$ and $GeO_2$>

Condition (A), condition (B1) and condition (B2) limit the glass network former components. That is, the glass GA1 et cetera include a single component of $SiO_2$ or $SiO_2$ that includes a minimal amount of $B_2O_3$ as a glass network former, and do not contain multiple other glass network former components such as $P_2O_5$ and $GeO_2$. The reason the content of $SiO_2$ is 20 to 55 wt % is in order to obtain stable glass. Because $P_2O_5$ and $GeO_2$ lower the transmittance in the blue color wavelength region in particular and are difficult to form into glass by crystallization, the glass GA1 et cetera do not contain $P_2O_5$ and $GeO_2$.

A $B_2O_3$ amount is more preferably 0 to 2 wt %. $B_2O_3$ has an effect of preventing crystallization of glass and improving X-ray resistance. In this connection, as described later, there is a strong relationship between the optimal $B_2O_3$ amount and an $La_2O_3$ amount.

<Condition (C) ($BaO+SrO+La_2O_3+Lu_2O_3+Ta_2O_5+Gd_2O_3+WO_3$): 25 to 72 wt %>

Condition (C) shows that the compositions of the glass GA1 et cetera include at least any one of BaO, SrO, $La_2O_3$, $Lu_2O_3$, $Ta_2O_5$, $Gd_2O_3$ and $WO_3$, and that the total amount thereof is 25 to 72 wt %. Condition (C) is a condition for achieving a refractive index nd of 1.56 to 1.74. In glass having a refractive index in the vicinity of 1.65 as an nd that was most studied according to the embodiment of the present invention, the total amount of ($BaO+SrO+La_2O_3+Lu_2O_3+Ta_2O_5+Gd_2O_3+WO_3$) is more preferably 39 to 46 wt %.

BaO is an essential component for obtaining a high refractive index and a high transmittance in the blue region, and has an effect on meltability and stability, and a content thereof at which BaO has an effect and an adverse effect is not manifested (hereunder, referred to simply as "there is an effect") is (D) BaO: 15 to 35 wt %, and preferably 25 to 30 wt %. Further, when a part of BaO is replaced with SrO, there is an effect of preventing crystallization, and in particular there is an effect in a glass that has a large content of Ba or La or the like for realizing a high refractive index. Preferably the content of SrO is 0 to 15 wt %, and does not exceed the content of BaO.

The relationship between the $B_2O_3$ amount and $La_2O_3$ will now be described taking as an example La—Ba—Si—B-based glass having a BaO content of 26.87 wt %, an $La_2O_3$ content of 9.27 wt % and a $Ta_2O_5$ content of 3.00 wt %, more specifically, a ($BaO+SrO+La_2O_3+Lu_2O_3+Ta_2O_5+Gd_2O_3+WO_3$) content of 39.14 wt %. If a molar % ratio of $La_2O_3/B_2O_3$ is greater than or equal to 1, because boron (B) in the glass occupies three coordination sites, although there is a small degree of coloring caused by X-ray irradiation, recovery is fast. If a molar % ratio of $La_2O_3/B_2O_3$ is below 1, because boron (B) in the glass occupies four coordination sites, there is a stronger degree of coloring caused by X-ray irradiation and recovery is slow.

More specifically, although there is a strong relationship between the content of $La_2O_3$ and the content of $B_2O_3$, to ensure that the possibility of crystallization does not gradually increase, the content of $La_2O_3$ is preferably equal to or less than 12.0 wt % (3.6 mol %), and more preferably is equal to or less than 9.3 wt % (2.8 mol %).

It is preferable to add $Ta_2O_5$ as an element that makes the relationship between X-ray resistance and transmittance of blue color compatible. Further, when $Ta_2O_5$ is added to the glass composition, since there is a tendency for the amount of elution of platinum from a platinum crucible to increase, it is necessary to reduce the amount of $Sb_2O_3$ and increase the amount of $Na_2SO_4$ as flux to thereby improve meltability.

Blue transmittance was higher in glass in which a part of $La_2O_3$ was replaced with $Lu_2O_3$ compared to glass containing only $La_2O_3$. It is considered that this is because the light absorption edge of $Lu_2O_3$ is on a short wavelength side compared to $La_2O_3$. In addition, $Lu_2O_3$ also has a greater effect with respect to raising the refractive index of glass compared to $La_2O_3$. Therefore, an equivalent effect can be obtained even when an added amount of $Lu_2O_3$ thereof is smaller (proportion of the composition) in comparison to $La_2O_3$. More specifically, $Lu_2O_3$ is a preferable component for obtaining a particularly high refractive index and a particularly high transmittance. On the other hand, because $Lu_2O_3$ is expensive, $Lu_2O_3$ is suitable for light guides with relatively high specifications.

<Condition (D) ZnO: 0 to 30 wt %; Condition (E): does not Contain $Al_2O_3$; Condition (F): does not Contain $ZrO_2$>

Condition (D), condition (E), and condition (F) are conditions for achieving a transmittance that is described later. In order to decrease a Pt amount that is dissolved in as an impurity in melting in a platinum crucible, it is necessary to melt at a relatively low temperature (for example, 1000 to 1300° C.) and for a short time (for example, 6 hours). Because $Al_2O_3$ and $ZrO_2$ have a high melting point and are difficult to melt, $Al_2O_3$ and $ZrO_2$ do not become sufficiently homogeneous after melting at a low temperature for a short time, and may form minute particles of several tens of nm to several hundreds of μm and remain in the glass. Although these particles do not constitute a problem in the case of a normal lens with an optical path length of several mm to several tens of mm or the like, in the case of an optical path length of several meters, such as in a medical endoscope, a decrease in white color light transmittance (T380-750) caused by scattering, and particularly a large decrease in blue color light transmittance (T400) is a problem.

Further, in the case of melting in a quartz crucible also, since the quartz crucible is eroded at a high temperature and $SiO_2$ is eluted into the glass, there is a concern that the $SiO_2$ will cause the production of cords and strain and consequently the yield will decrease due to the glass cracking or the like, or that a desired refractive index will not be obtained. Therefore, it is necessary to lower the melting temperature in melting in a quartz crucible also. Consequently, it is an important condition that the glass composition does not contain $Al_2O_3$ and $ZrO_2$.

Note that it is extremely difficult to purify $ZrO_2$, and hence there is also the problem that it is practically impossible to obtain a commercially available high-purity raw material that satisfies an impurity level that is described later.

In this connection, generally, $Al_2O_3$ and $ZrO_2$ are actively added to glass to improve chemical durability. However, when the glass GA1 et cetera that are core glass are fiberized, the surface of the fibers is covered with a cladding glass and the end faces of the fibers are also covered with an adhesive or the like, and hence the core glass does not come in direct contact with water or chemicals or the like. Therefore, a high chemical durability is not an important property with respect to the glass GA1 et cetera.

That is, the above described conditions of the glass GA1 et cetera are conditions that make good use of the characteristics that are required for core glass for light guides, which are different to normal optical glass or glass for molding.

In this connection, although ZnO of condition (D) is an optional component, since there is an effect on meltability and stability, it is more preferable that the composition contains (D1) 4 to 16 wt % of ZnO to obtain a high refractive index as well as a high transmittance in the blue region.

<Condition (H) ($Na_2O+K_2O$): 0 to 15 wt %>

In condition (H), ($Na_2O+K_2O$) means at least either one of $Na_2O$ or $K_2O$. Condition (H) is a condition for suppressing crystallization of glass and controlling viscosity. Although when $Li_2O$ or $Cs_2O$ is used there is an effect that is similar to that of $Na_2O$ or $K_2O$, $Na_2O$ or $K_2O$ is preferable because there are cases in which $Li_2O$ promotes crystallization of glass and causes devitrification, while $Cs_2O$ is expensive. However, because $Na_2O$ and $K_2O$ lower the refractive index, in some cases a desired refractive index cannot be obtained if the amount of $Na_2O$ or $K_2O$ is too high. Therefore, an added amount thereof is more preferably (H1) 4 to 10 wt %.

<Condition (I) $Sb_2O_3$: 0 to 0.050 wt %>

Condition (I) is an essential condition to ensure blue color light transmittance (T400). Since $Sb_2O_3$ promotes homogenization (melting of raw materials of glass and clarifying action that removes bubbles) of glass, an amount of approximately 0.3 to 0.5 wt % thereof is used for common optical glass. However, in the case of the added amount for common optical glass, a blue color is noticeable since $Sb_2O_3$ uniquely absorbs blue color light and there is also an adverse effect on X-ray resistance, and it is not possible to obtain properties that satisfy the specifications of the glass GA1 et cetera.

$Sb_2O_3$ absorbs light in the blue region of the spectrum. Further, since $Sb_2O_3$ also has an action that promotes elution of platinum from a platinum crucible, glass to which $Sb_2O_3$ has been added is liable to absorb a large amount of light in the blue region. Consequently, it is desirable from the viewpoint of blue color light transmittance that an added amount of $Sb_2O_3$ is small. However, in glass that does not contain $Sb_2O_3$, non-homogenization and cords due to insufficient stirring at the time of manufacture or absorption caused by localized oxygen defects are liable to occur. Hence, an added amount of 0 wt % of $Sb_2O_3$ is not preferable. The added amount of $Sb_2O_3$ is preferably (I): 0 to 0.050 wt %, and more preferably (I1): 0.001 to 0.010 wt %.

Further, since non-homogenization and cords due to insufficient stirring of glass is liable to occur when the added amount of $Sb_2O_3$ is decreased from a normally added amount, in order to adequately agitate the glass raw material it is effective to perform physical bubbling by means of He gas or Ar gas in addition to normal stirring. When performing bubbling with a non-oxide-based gas, there is a relative shortage of oxygen, and oxygen of a $B_2O_3$ or $SiO_2$ component generates a defect and coloring is liable to occur.

<Condition (J) ($Na_2SO_4+K_2SO_4$): 0.26 to 1.63 wt %; Condition (G): does not Contain PbO and $As_2O_3$>

Condition (J) shows that a predetermined amount of at least one of $Na_2SO_4$ and $K_2SO_4$ is included, and is an essential condition for realizing homogenization in view of condition (I). That is, since the $Sb_2O_3$ content according to condition (I) is less than a content thereof in normal optical glass, the capacity to dissolve the raw materials is insufficient, and melting at a high temperature and for a long time is necessary to prevent inhomogeneities (unmelted remnants). In such case, as described above, when melting is performed using a platinum crucible, Pt dissolves into the glass and the transmittance decreases. When melting with a quartz crucible also, as the result of compositional variations caused by elution of $SiO_2$ component, the desired physical properties are not obtained and the yield decreases. This is a particularly significant problem when manufacturing on an industrial scale (several tens of kg/batch to several tons/batch) because it is necessary to perform melting with a quartz crucible, and it is essential to improve the yield. In addition, when $B_2O_3$ is included, the impact of this problem is particularly large since erosion of the quartz crucible is severe. In this connection, it has been reported that $As_2O_3$ which has a similar effect to $Sb_2O_3$ has toxicity, and hence, similarly to PbO, $As_2O_3$ is not added to the glass GA1 et cetera (condition (G)).

That is, in view of condition (I), promoting melting of the raw materials was an issue. In addition, it was an essential condition that collectively no adverse effects arose with respect to blue color light transmittance (T400) and X-ray irradiation resistance (XR).

The inventor conducted extensive studies and found that such issues could be solved by satisfying condition (J), and more preferably by making the content of ($Na_2SO_4+K_2SO_4$) 0.32 to 0.78 wt %. It has been found that because $Na_2SO_4$ or $K_2SO_4$ decomposes and generates $SO_3$ gas and oxygen gas during a process of melting (for example, at 890° C.) of at least one of $Na_2SO_4$ and $K_2SO_4$ added to glass raw materials, melting of raw materials is promoted by physical bubbling. If an amount of at least one of $Na_2SO_4$ and $K_2SO_4$ that is added to glass raw material is below the above described range, promotion of melting of the raw material is inadequate, while if the added amount exceeds the above described range, although melting proceeds, excessive $SO_3$ gas generates a foamed solid referred to as "scum" that includes an element with a relatively light specific gravity such as $SiO_2$ or an alkali metal and is a cause of inhomogeneities.

Between 10 and 90% (typically, between 40 and 60%) of an added amount of at least one of $Na_2SO_4$ and $K_2SO_4$ vaporizes to outside the glass as $SO_3$ gas during melting, and the remaining 90 to 10% (typically, 60 to 40%) remains in the glass GA1 et cetera after melting. In this connection, because condition (J) stipulates the amount of ($Na_2SO_4$+$K_2SO_4$) that remains in the glass GA1 et cetera, a charge amount as a raw material before melting is approximately 1.1 to 10 times (typically, 1.7 to 2.5 times) the amount described in condition (J). For example, if $Na_2SO_4$ is used as a raw material and a volatile portion is taken to be 50%, an amount in a range from 0.52 to 3.26 wt % is added to the raw materials. In this connection, $K_2SO_4$ was added to GA3, while $Na_2SO_4$ was added to the glasses other than GA3.

Although there are cases where an S component is dissolved into glass as contamination from a container or the like used to dissolve the glass, the S component amount does not reach the order of a fraction of a percent as in the present invention and, in addition, if the melting temperature is increased almost all of the S component vaporizes and does not remain in the glass, a fixed quantity of S (sulfur) in the glass is an important factor for determining whether or not the S component is appropriate for the present invention. It is possible to perform quantitative analysis of an S (sulfur) component remaining in the glass GA1 et cetera by an ordinary analysis method such as, for example, fluorescent X-ray analysis, ICP, EPMA, or EDX/WDX.

Although the production yield of glass changes depending on the melting apparatus and melting conditions and the like, for example, the yield for glass with a composition that satisfied only condition (I) and which did not contain $Na_2SO_4$ and $K_2SO_4$ (($Na_2SO_4$+$K_2SO_4$)=0 wt %) was 40%. In contrast, the yield for glass with a composition that satisfied condition (I) and condition (J) was 90% or more, representing a significant improvement.

<Impurities>

Glass raw materials generally include impurities. Because impurities of transition metals and the like have absorption in the visible light region, such impurities constitute a problem in production of glass that requires a high transmittance, such as the glass GA1 et cetera, and therefore such impurities should be kept to a minimum.

In addition, among elements that are a cause of coloring, care is particularly required with respect to Fe, Cr, Co, and Ni, since purification thereof is difficult. The content of the above described transition metal components in commonly available raw materials is a level of several ppm. It is necessary to select a raw material that is subject to a favorable purification process to achieve such impurity levels or to use a self-made raw material to create the glass.

In the glass GA1 et cetera, specifically, it is more preferable that a content of Fe is 3 ppm or less, a content of Cr is 0.03 ppm or less, a content of Co is 0.01 ppm or less, and a content of Ni is 0.02 ppm or less.

In this case, to avoid dissolving impurities into the raw materials, a paper container or a plastic container was used when dissolving the raw materials of the glass GA1 et cetera according to the embodiment, and a metal container made of stainless steel or iron or the like or a glass container such as a beaker was not used. Glass melt was prepared using a platinum crucible to which zirconia was added or a quartz crucible, and stirring was performed with a sapphire rod.

In this connection, as will be clear from the compositions described below, since the compositions of the glass GA1 et cetera according to the embodiment are designed to have a relatively low melting point, the compositions can be melted at a relatively low temperature and in a short time, namely, a temperature between 1000° C. and 1300° C. and a melting time period of 2 to 8 hours. Therefore, even when a platinum crucible is used, dissolving of impurities into the glass is suppressed. If Pt dissolves into the glass, the transmittance and light amount will be adversely affected because the glass will have absorption in the blue color light region. Hence, a Pt amount is preferably 0.2 ppm or less.

It is preferable to use a two-stage melting method as a method for suppressing dissolving of impurities from a platinum crucible. According to this method, in a melting process as the first stage, the raw materials of the glass are melted using a quartz crucible with few impurities or a crucible made of sapphire or the like that does not include platinum and includes an extremely small amount of a transition metal such as Cr, and thereafter secondary melting is performed at a relatively low temperature and for a short time using a Pt crucible to remove inhomogeneities and cords. Although the quartz crucible may erode and $SiO_2$ may dissolve into the glass of the present system, a countermeasure with respect to such dissolving of $SiO_2$ into the glass is taken by estimating the amount thereof in advance and decreasing the amount of $SiO_2$ raw material by a corresponding amount or the like.

Further, as described in the foregoing, it is particularly preferable from the viewpoint of productivity to melt raw materials in a quartz crucible when performing mass production, and it is possible to melt the glass GA1 et cetera of the embodiment in a quartz crucible.

<Characteristics>

Table 1 shows measurement results for the glasses for light guide fibers GA1 to GA5 of the embodiment and the glasses GAR1 to GAR3 of the comparative examples.

In each of the glass GA1 et cetera, a content of Fe is 3 ppm or less, a content of Cr is 0.03 ppm or less, a content of Co is 0.01 ppm or less, a content of Ni is 0.02 ppm or less, and a content of Pt is 0.2 ppm or less. In addition, for the glass GA1 et cetera, the transmittance (T380-750) of light of a wavelength between 380 and 750 nm of the fiber is 96%/m or more, and the transmittance (T400) of light of a wavelength of 400 nm of the fiber is 90%/m or more.

Further, the XR of the fibers of the glass GA1 et cetera is 90% or more. That is, with respect to fibers of the glass GA1 et cetera, after an X-ray resistance test in which a recovery process is performed in which illuminating light of 64 lumen/$mm^2$ is guided through the fibers for 600 minutes after X-ray irradiation of 2.5 Gy, the transmittance of light of a wavelength between 380 to 750 nm recovered to a level of 90% or more relative to the transmittance before the X-ray irradiation.

In contrast, none of the glasses GAR1 to GAR3 of the comparative examples satisfied the predetermined specifications.

Furthermore, with respect to the composition of the glass GA2 of the embodiment, test manufacture of 10 batches of each of a composition with $Na_2SO_4$ and an embodiment (GAR4) in which the composition did not contain $Na_2SO_4$ but instead contained a corresponding amount of $Na_2O$ were performed under the same manufacturing conditions and variations in the lots were measured. The results showed that the refractive index nd was 1.638 to 1.640, T(380-750) was 98.9 to 99.6%, and T(400) was 98.9 to 99.5%. In contrast, there were large variations with respect to the glass GAR1 of the comparative example, with the refractive index nd being 1.634 to 1.652, T(380-750) being 97.4 to 99.6%, and T(400) being 89.9 to 97.2%. It is considered that the reason for the large variations in the glass according to the comparative example was that melting was insufficient and consequently there were unmelted remnants of raw materials and inhomogeneities in the glass.

It is clear from the foregoing results that each of the glasses GA1 to GA5 of the present embodiment is a core glass for a light guide fiber that does not include lead and has high transmittance and a high degree of X-ray resistance.

The refractive index nd of the glass GA1 is 1.65, and it is thus possible to realize a light guide for which the NA is 0.71 in a case where the fiber is manufactured with a cladding in which silica with a refractive index nd of 1.49 is a main component, and to realize a light guide for which the NA is 0.67 in a case where the fiber is manufactured with a cladding in which silica with a refractive index nd of 1.51 is a main component. In addition, the refractive index nd of the glass GA5 is 1.74, and it is thus possible to realize a fiber for which the NA is 0.90 in a case where the fiber is manufactured together with cladding glass in which silica with a refractive index nd of 1.49 is a main component.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A glass for a light guide fiber that is used in a core of a fiber of a light guide, wherein the glass has a refractive index nd between 1.56 and 1.74 and has a composition described hereunder:

(A) $SiO_2$: 20 to 55 wt %, (B11) $B_2O_3$: 0 to 2.0 wt %, (B2) does not contain $P_2O_5$ and $GeO_2$, (C1) ($BaO+SrO+La_2O_3+Lu_2O_3+Ta_2O_5+Gd_2O_3+WO_3$): 39 to 46 wt %, (D1) ZnO: 4 to 16 wt %, (E) does not contain $Al_2O_3$, (F) does not contain $ZrO_2$, (G) does not contain PbO and $As_2O_3$, (H1) ($Na_2O+K_2O$): 4 to 10 wt %, (I) $Sb_2O_3$: 0 to 0.050 wt %, and (J1) ($Na_2SO_4+K_2SO_4$): 0.32 to 0.78 wt %.

2. The glass for a light guide fiber according to claim 1, wherein a content of Fe is 3 ppm or less, a content of Cr is 0.03 ppm or less, a content of Co is 0.01 ppm or less, a content of Ni is 0.02 ppm or less, and a content of Pt is 0.2 ppm or less.

3. The glass for a light guide fiber according to claim 2, wherein a transmittance of a light of a wavelength between 380 and 750 nm of the fiber is 96%/m or more, and a transmittance of a light of a wavelength of 400 nm of the fiber is 90%/m or more.

4. The glass for a light guide fiber according to claim 3, wherein after an X-ray resistance test is performed that implements a recovery process in which an illuminating light of 64 lumen/$mm^2$ is guided through the fiber for 600 minutes after the fiber is exposed to X-ray irradiation of 2.5 Gy, a transmittance of a light of a wavelength between 380 and 750 nm of the fiber recovers to 90% or more relative to a transmittance thereof before exposure to the X-ray irradiation.

5. The glass for a light guide fiber according to claim 4, wherein raw materials are melted in a quartz crucible.

* * * * *